UNITED STATES PATENT OFFICE.

TAICHIRO MIYATA AND SENZO KUWAYAMA, OF NEW YORK, N. Y.

SHOE-DRESSING AND METHOD OF MAKING THE SAME.

1,106,957.

Specification of Letters Patent.

Patented Aug. 11, 1914.

No Drawing.

Application filed December 10, 1913. Serial No. 805,831.

*To all whom it may concern:*

Be it known that we, TAICHIRO MIYATA and SENZO KUWAYAMA, subjects of the Mikado of Japan, residing at New York, in the county of New York and State of New York, have invented certain new and useful Improvements in Shoe-Dressings and Method of Making the Same, of which the following is a specification.

This invention relates to shoe dressings and method of making the same and more particularly to a dressing for white leather and canvas shoes now in universal use. Heretofore considerable trouble has been experienced by the users of dressings of this kind, due to the fact that the dressing as a whole and particularly the coloring matter contained therein, would rub off upon the clothes.

One of the objects of the invention is to provide a dressing for shoes or the like which will not rub off upon or soil clothes or other objects with which the shoe may come in contact.

Another object of the invention is to provide a dressing which will when applied in paste form quickly dry and when dry impart a highly polished finish to the shoe without the necessity of a subsequent manual rubbing operation.

A still further object is to provide a dressing which is substantially water-proof.

Other and further objects and advantages of the invention will be apparent from the following specification.

In carrying out our invention we intimately mix four pounds of soapstone, four pounds of plastic clay and eight pounds of Paris white or other good grade of whiting, adding thereto about four quarts (or eight pounds) of water, either after, before or during the mixing operation. The clay used is advantageously a white pipe clay which contains a relatively high percentage of silica, but any white clay may be used which has the desired plasticity in the moist condition. We then boil a mixture of one pound of gum tragacanth and twenty four quarts (48 pounds) of water for a period of three hours or until the whole forms a thick mucilage. The two compounds or mixtures thus obtained are next placed in a rotary mixer, or are otherwise suitably mixed and preferably at this time small quantities of alcohol and bluing are added. The final product thus obtained is of a creamy or pasty consistency which can readily be applied to and rubbed into the shoe with the fingers. On drying it gives a substantially waterproof dressing.

It is well known that when gum tragacanth is treated with water one part dissolves and the other part swells up, absorbing water to the extent of as high as fifty times the weight of the gum used. The great affinity of the gum for water in a measure accounts for the fact that an application of the dressing to a shoe renders the latter to all practical purposes water-proof, the theory being that whatever water the insoluble soapstone, clay and whiting in the dressing fail to shed will be absorbed by the gum swelling it and closing the pores, and is thus prevented from soaking through the shoe. Furthermore, by virtue of the excellent adhesive qualities of tragacanth there is no danger of the dressing rubbing off, with a consequent decrease in the life of the "shine" and a soiling of the clothes.

The principal function of the alcohol used is that of a drier, but it also serves to prevent souring in addition to imparting a pleasant odor to the dressing. Bluing is added in slight quantities to give a certain color effect when considered desirable, but this ingredient can be dispensed with.

We have found that while the composition produced with the aid of tragacanth, clay, chalk, soapstone and water in the proportions specified is not sticky to the touch, it is sufficiently adhesive so that the dressing is held intact after it has been applied to the shoe and become thoroughly dry.

As many changes could be made in the proportions of ingredients used in the manufacture of the above product within the scope of the claims, and without departing from the spirit or scope thereof, it is intended that all matter contained in the accompanying specification shall be interpreted as illustrative and not in a limiting sense.

Having thus described our invention, what we claim is:

1. A shoe dressing consisting of approximately twenty parts by weight of hydrated gum tragacanth, four parts of soapstone, four parts of clay, eight parts of chalk and sufficient water to bring the whole to a creamy consistency.

2. The herein described process of making a shoe dressing which consists in boiling one part of gum tragacanth in forty parts of water for approximately three hours, then intimately mixing together four
5 parts of soapstone, four parts of clay, eight parts of chalk and eight parts of water and mixing the two compounds together.

In testimony whereof we affix our signatures in presence of two witnesses.

TAICHIRO MIYATA.
SENZO KUWAYAMA.

Witnesses:
ANNA F. FITZGERALD,
LULU MILROY.